United States Patent
Geck et al.

(10) Patent No.: US 8,080,772 B2
(45) Date of Patent: Dec. 20, 2011

(54) MODULAR, HARNESSLESS ELECTROMECHANICAL ACTUATION SYSTEM ASSEMBLY

(75) Inventors: Kellan Geck, Chandler, AZ (US);
George Woessner, Phoenix, AZ (US);
Dwayne M. Benson, Chandler, AZ (US);
Bulent Sarlioglu, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/133,175

(22) Filed: Jun. 4, 2008

(65) Prior Publication Data
US 2009/0114763 A1    May 7, 2009

Related U.S. Application Data

(60) Provisional application No. 60/985,026, filed on Nov. 2, 2007.

(51) Int. Cl.
*F42B 10/00* (2006.01)
(52) U.S. Cl. ........................ 244/3.24; 244/3.21; 244/3.1
(58) Field of Classification Search .................. 244/3.21, 244/3.1, 3.24–3.3, 99.2, 76 A
See application file for complete search history.

(56) References Cited

U.S. PATENT DOCUMENTS

| | | | |
|---|---|---|---|
| 4,795,110 A * | 1/1989 | Lang | 244/3.24 |
| 5,249,761 A * | 10/1993 | Schroppel | 244/3.21 |
| 5,584,448 A | 12/1996 | Epstein et al. | |
| 5,593,109 A | 1/1997 | Williams | |
| 5,950,963 A * | 9/1999 | Speicher et al. | 244/3.21 |
| 6,247,666 B1 | 6/2001 | Baker et al. | |
| 6,394,855 B1 | 5/2002 | Sorvino et al. | |
| 6,474,594 B1 | 11/2002 | Johnson et al. | |
| 6,637,699 B2 * | 10/2003 | Banks et al. | 244/3.21 |
| 6,827,310 B1 * | 12/2004 | Whitham | 244/3.24 |
| 6,848,648 B2 * | 2/2005 | Klestadt et al. | 244/3.23 |
| 7,038,192 B2 * | 5/2006 | Lu et al. | 250/231.13 |
| 7,097,132 B2 * | 8/2006 | Banks et al. | 244/3.29 |
| 7,175,131 B2 | 2/2007 | Dodu et al. | |
| 7,178,427 B2 * | 2/2007 | Christensen | 74/640 |
| 7,219,579 B2 * | 5/2007 | Turner | 74/665 N |
| 7,246,539 B2 * | 7/2007 | Turner | 74/665 N |
| 7,255,304 B2 * | 8/2007 | Ericson et al. | 244/3.24 |
| 7,273,067 B2 * | 9/2007 | Quitmeyer et al. | 137/553 |
| 2004/0164202 A1 * | 8/2004 | Klestadt et al. | 244/3.24 |
| 2006/0231784 A1 * | 10/2006 | Quitmeyer et al. | 251/129.11 |
| 2006/0255207 A1 * | 11/2006 | Wingett et al. | 244/99.4 |

* cited by examiner

*Primary Examiner* — Tien Dinh
*Assistant Examiner* — Justin Benedik
(74) *Attorney, Agent, or Firm* — Ingrassia Fisher & Lorenz, P.C.

(57) ABSTRACT

A modular electromechanical actuation system assembly is provided that includes an electronic control unit housing having a plurality of motor receptacles and a plurality of battery receptacles formed in an outer surface thereof. Each of the motor receptacles has an associated motor electrical interface, and each of the battery receptacles has an associated battery electrical interface. An electronic control unit is disposed within the electronic control unit housing and is electrically coupled to each of the motor electrical interfaces and each of the battery electrical interfaces. A plurality of motors are supported, one each, within one of the motor receptacles, and a plurality of batteries are supported, one each, within one of the battery receptacles.

3 Claims, 5 Drawing Sheets

MODULAR, HARNESSLESS ELECTROMECHANICAL ACTUATION SYSTEM ASSEMBLY

CROSS-REFERENCE TO RELATED APPLICATION

This application claims the benefit of U.S. Provisional Application No. 60/985,026, filed Nov. 2, 2007.

TECHNICAL FIELD

The present invention generally relates to electromechanical actuation systems and, more particularly, to an electromechanical actuation system that is compact, modular, and includes no electrical harnesses.

BACKGROUND

Actuator control systems are used in myriad environments. For example, many vehicles including, for example, missiles, rockets, aircraft, spacecraft, watercraft, and numerous other terrestrial and non-terrestrial vehicles, include one or more actuator control systems to effect the movement of various control surfaces or components. In many applications, the actuator control systems include an electronic control unit, a plurality of actuators, and a plurality of power drive units, such as motors, that are controllably energized from a source of drive power to move the actuators, and thus the control surfaces or components, to a commanded position.

In the context of at least some of the above-mentioned vehicles, it is desirable that the actuator control system exhibit relatively high power density and relatively high reliability. It is additionally desirable in many of these same contexts that the actuator control system exhibits a relatively small space envelope and be relatively low in weight. The present invention addresses at least these needs.

BRIEF SUMMARY

In one embodiment, and by way of example only, a modular electromechanical actuation system assembly includes, an electronic control unit housing, an electronic control unit, a plurality of electric motors, and a plurality of batteries. The electronic control unit housing has a plurality of motor receptacles and a plurality of battery receptacles formed in an outer surface thereof. Each of the motor receptacles has an associated motor electrical interface, and each of the battery receptacles has an associated battery electrical interface. The electronic control unit is disposed within the electronic control unit housing and is electrically coupled to each of the motor electrical interfaces and each of the battery electrical interfaces. Each motor is disposed within one of the motor receptacles, is at least partially surrounded by the electronic control unit housing, and is electrically coupled to the associated motor electrical interface. Each battery is disposed within one of the battery receptacles, is at least partially surrounded by the electronic control unit housing, and is electrically coupled to the associated battery electrical interface.

In another exemplary embodiment, a modular electromechanical fin actuation system assembly includes an electronic control unit housing, an electronic control unit, a plurality of batteries, a plurality of motors, a plurality of actuators, a bearing support assembly, and a plurality of flight control fins. The electronic control unit housing has a plurality of motor receptacles and a plurality of battery receptacles formed in an outer surface thereof. Each of the motor receptacles has an associated motor electrical interface, and each of the battery receptacles has an associated battery electrical interface. The electronic control unit is disposed within the electronic control unit housing and is electrically coupled to each of the motor electrical interfaces and each of the battery electrical interfaces. Each battery is disposed within one of the battery receptacles, is at least partially surrounded by the electronic control unit housing, and is electrically coupled to the associated battery electrical interface. Each motor is disposed within one of the motor receptacles, is at least partially surrounded by the electronic control unit housing, and is electrically coupled to the associated motor electrical interface. Each actuator is coupled to one of the motors. The bearing support assembly is coupled to the electronic control unit housing and engages each of the motors. Each flight control fin is rotationally mounted on the output shaft support plate and is coupled to one of the actuators.

Furthermore, other desirable features and characteristics of the actuation control system will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although an embodiment of the actuation control system is described as implementing a flight control fin actuation system for a projectile, it will be appreciated that it may also be used in various other vehicles and various other vehicle control systems, and in various non-vehicular environments.

Figure 1:
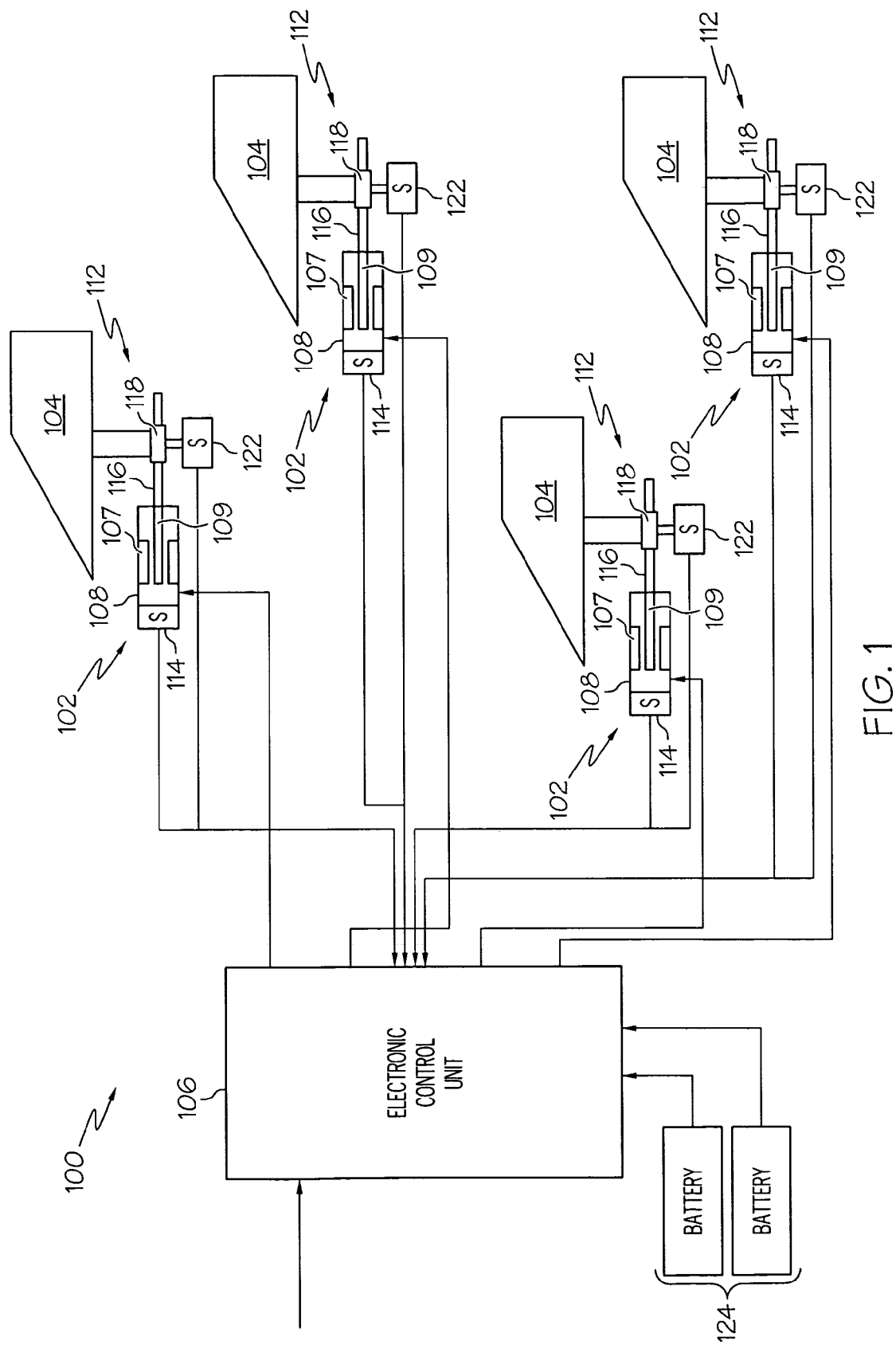
FIG. 1 depicts a functional block diagram of an exemplary flight control fin actuation system.

Turning first to FIG. 1, a functional block diagram of an exemplary flight control fin actuation system 100 that may be implemented using the inventive configuration described herein is depicted. The system 100 includes a plurality of actuator assemblies 102, a plurality of flight control fins 104, and an electronic control unit 106. The actuator assemblies 102 each include a motor 108 and an actuation device 112. The motors 108 are implemented as electric motors, each including a stator 107 and a rotor 109, and may be any one of numerous types of AC or DC motors now known or developed in the future including, for example, an AC induction motor or a brushed DC motor. In a preferred embodiment, however, the motors 108 are implemented as brushless DC motors. In this regard, it is seen that the depicted system 100 further includes a plurality of motor position sensors 114. Each motor position sensor 114 is associated with one of the motors 108, and is configured to sense the rotational position of the motor rotor 109 and supply rotational position signals to the electronic control unit 106.

No matter how the motors 108 are specifically implemented, each is configured, upon being properly energized, to rotate and thereby supply a rotational drive force to one of the actuation devices 112. The actuation devices 112 each include an actuation member 116, which is coupled to receive the rotational drive force from the motor 108, and a translation member 118. In response to the rotational drive force supplied from the motor 108, the actuation member 116 rotates. The translation member 118 is coupled to the actuation member 116 and is configured, upon rotation thereof, to translate to a position. As will be described in more detail further below, in one particular embodiment the actuation member 116 and the translation member 118 are implemented as a ballscrew assembly, in which the ballscrew functions as the actuation member 116 and the ballnut functions as the translation member 118. It will be appreciated, however, that this is merely exemplary, and that the actuation member 116 and translation member 118 could be implemented as any one of numerous assemblies that convert rotational motion into translational motion including, for example, jackscrew assemblies and rollerscrew assemblies, just to name a few. It will additionally be appreciated that the actuation device 112 could be implemented as any one of numerous other types of actuation devices including, but not limited to, numerous types of rotary actuation devices and/or numerous types of linear actuation devices, just to name a few.

The flight control fins 104 are each coupled to one of the actuation devices 112, and more specifically to one of the actuation device translation members 118. As will be described in more detail further below, the flight control fins 104, in at least one particular embodiment, are each coupled to an actuation device translation member 118 via a gear set (not illustrated in FIG. 1). In any case, each flight control fin 104, in response to translation of the actuation device translation member 118, rotates to a position commanded by the electronic control unit 106. As FIG. 1 also depicts, a plurality of fin position sensors 122 are each configured to sense the position of one of the flight control fins 104 and to supply a fin position feedback signal to the electronic control unit.

The electronic control unit 106 is adapted to receive flight control commands from the vehicle (e.g., a suitable non-illustrate flight control computer), and to additionally receive above-described rotational position signals and fin position feedback signals. The electronic control unit 106, in response to the commands and signals, implements suitable motor commutation control and suitable position control to controllably energize the motors 108 from a power source 124 and move the flight control fins 104 to the commanded positions. Though not depicted, it will be appreciated that the electronic control unit 106 preferably includes non-illustrated current feedback sensors to assist in implementing motor commutation control. Moreover, and as FIG. 1 further depicts, the power source from which the electronic control unit 106 controllably energizes the motors 108 preferably comprises a plurality of batteries 124. It is noted that in a particular preferred embodiment, the batteries 124 are each thermal batteries that may be independently initiated.

The actuation system 100 depicted in FIG. 1 and described above is preferably implemented in a modular configuration that fits within a relatively small space envelope. For example, in one particular embodiment, the actuation system 100, exclusive of the flight control fins 104, fits within a space envelope having a 6.5 inch diameter and a 7.1 inch length. It will be appreciated that the system 100 could be configured to fit within various other space envelope sizes. This particular space envelope size is provided herein as an example of the relatively small space envelope achieved. A particular physical implementation of a modular actuation control system that embodies this relatively small space envelope, and that may also be sized to achieve numerous other space envelope sizes, is depicted in FIGS. 2-7, and will now be described.

Figure 2:
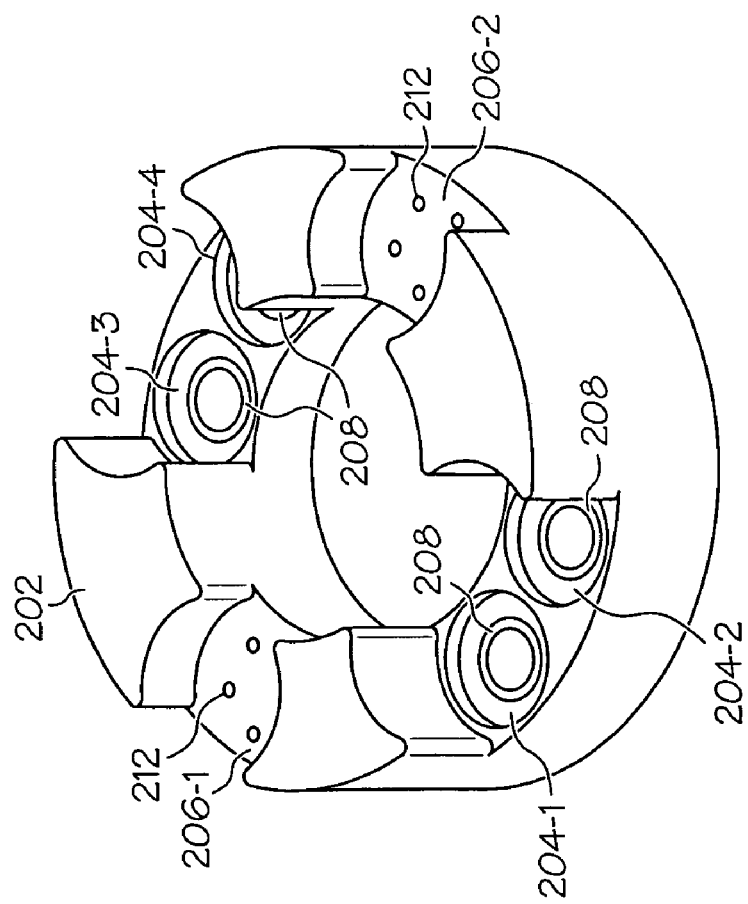

With reference first to FIG. 2, an electronic control unit housing 202 is depicted. The electronic control unit housing 202 has the above-described electronic control unit 106 housed therein, and further includes a plurality of motor receptacles 204 and a plurality of battery receptacles 206. The motor receptacles 204 and battery receptacles 206 are each formed in an outer surface of the housing 202. The number of motor receptacles 204 and battery receptacles 206 may vary, but in the depicted embodiment the electronic control unit housing 202 includes four motor receptacles 204 (e.g., 204-1, 204-2, 204-3, 204-4) and two battery receptacles 206 (e.g., 206-1, 206-2).

No matter the specific number of receptacles 204, 206 included, each motor receptacle 204 includes a motor electrical interface 208, and each battery receptacle 206 includes a battery electrical interface 212. The motor electrical interfaces 208 and battery electrical interfaces 212 each extend through the electronic control unit housing 202 and are each electrically coupled to the electronic control unit 106. It will be appreciated that the motor and battery electrical interfaces 208, 212 may be variously implemented. For example, the electrical interfaces 208, 212 may be implemented as suitable male or female pin connectors, suitable male or female plug connectors, or the like.

Figure 3:
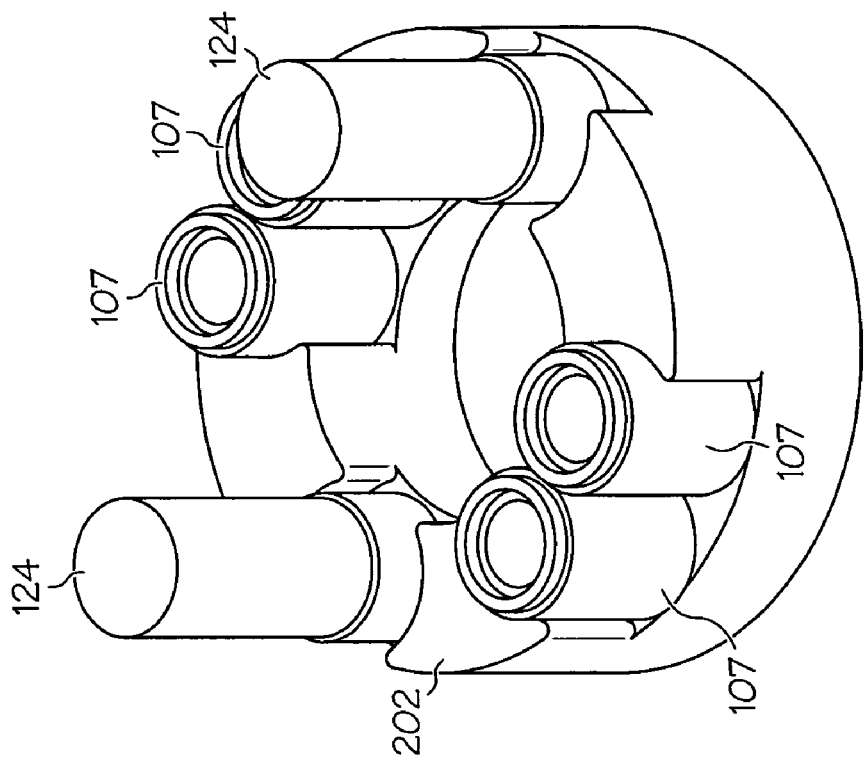
FIGS. 2-6 depict an exemplary physical implementation, in various stages of assembly, of a modular actuation control system that may be used to implement the system of FIG. 1.

Turning now to FIG. 3, it is seen that each actuator assembly motor 108 is disposed within one of the motor receptacles 204 and, when disposed therein, is at least partially surrounded by the electronic control unit housing 202. It is noted that for clarity FIG. 3 only depicts the motor stators 107. Each motor 108 is additionally configured, when disposed in a motor receptacle 204, to suitably interface with, and be electrically coupled to, the associated motor electrical interface 208. It may be similarly seen that each battery 124 is disposed within one of the battery receptacles 206 and, when disposed therein, is also at least partially surrounded by the electronic control unit housing 202. Each battery 124 is also configured, when disposed in a battery receptacle 206, to suitably interface with, and be electrically coupled to, the associated battery electrical interface 212. Thus, the electronic control unit housing 202 not only houses the electronic control unit 106, it also provides structural support for the actuator assembly motors 108 and the batteries 124. It will be appreciated that in some embodiments, the electronic control unit housing 202 could be configured such that it does not at least partially surround the actuator assembly motors 108, the batteries 124, or both.

Figure 4:
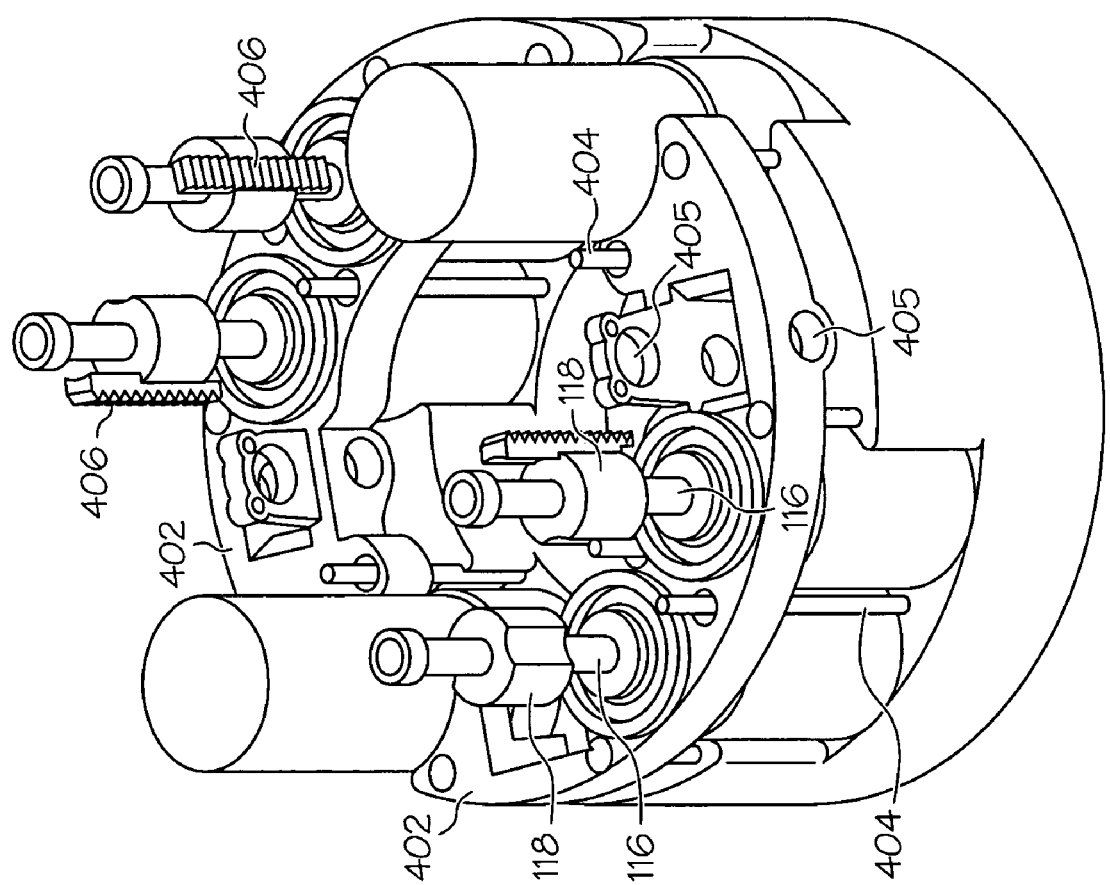

The motors 108 and batteries 124 are at least partially retained on the electronic control unit housing 202 by a plurality of bearing support assemblies. The bearing support assemblies 402, which are shown more clearly in FIG. 4, are coupled to the electronic control unit housing 202 via a plurality of fasteners 404, such as suitably threaded bolts. The bearing support assemblies 402 include suitable openings through which the actuator assemblies 102 extend, and are configured so that the batteries 124 extend between each of the ends. The bearing support assemblies 402 additionally include a plurality of bearing supports 405. As will be described momentarily, the bearing supports 405 each have a bearing mounted therein to rotationally couple the flight control fins 104 to one of the actuator assemblies 102. It will be appreciated that the bearing support assemblies 402 could be configured as a single support assembly, or more than two assemblies, if needed or desired.

With continued reference to FIG. 4, it is seen that the actuation devices 112, as was previously noted, are implemented as ballscrew-type devices. Thus, the actuation member 116 is implemented as a ballscrew and the translation member 118 is implemented as a ballnut. As FIG. 4 additionally depicts, a rack and pinion drive 406 is coupled to each of the translation members 118. The rack and pinion drives 406 interface with a gear set (not depicted in FIG. 4) that is coupled to one of the flight control fins 104 (also not depicted in FIG. 4).

Figure 5:
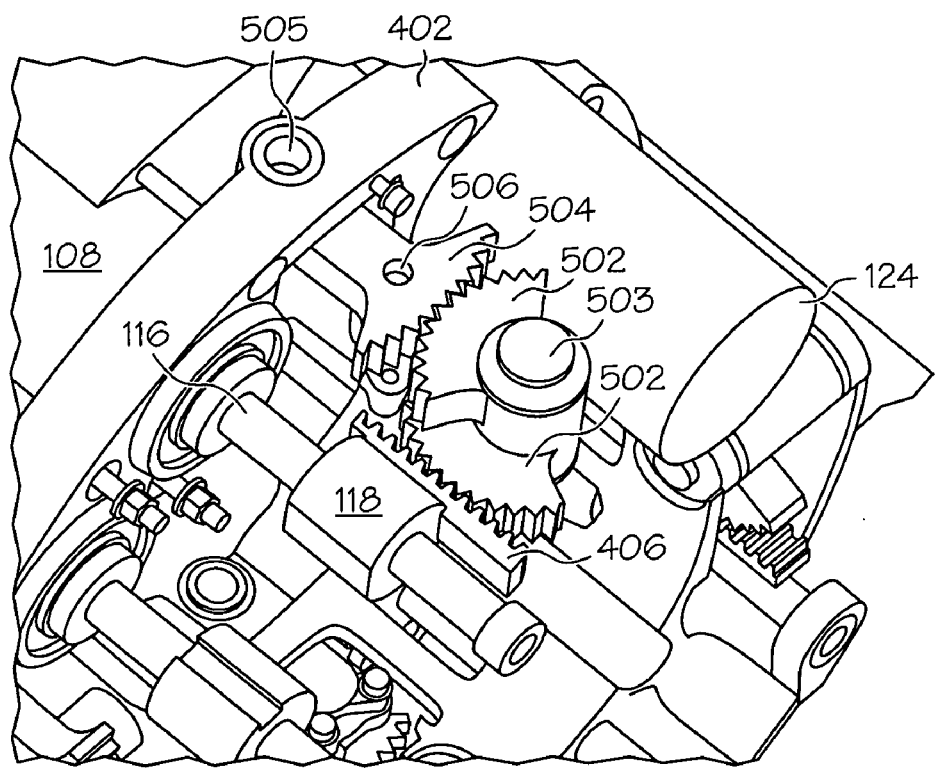

The gear sets that interface with the rack and pinion drives 406 may vary, but in a particular embodiment, and as shown more clearly in FIG. 5, each gear set includes a compound sector gear 502 and an output sector gear 504. Each compound sector gear 502 is rotationally mounted on one of the bearing support assemblies 402 via a suitable bearing 503, and is disposed between, and interfaces with, one of the rack and pinion drives 406 and one of the output sector gears 504. The output sector gears 504 are also each rotationally mounted on one of the bearing support assemblies 402 via a suitable bearing 505, and are coupled to one of the flight control fins 104 (not depicted in FIG. 5).

It will be appreciated that the above-described actuation transfer devices, which comprise a rack and pinion drive 406, a compound sector gear 502, and output sector gears 504, are merely exemplary of one particular actuation transfer device that may be used. It will additionally be appreciated that one or more, or all, of these drives and/or gears could be replaced with suitable substitutes. One example of a suitable alternate actuation transfer mechanism would be the well known pin and clevis drive arrangement.

Figure 6:
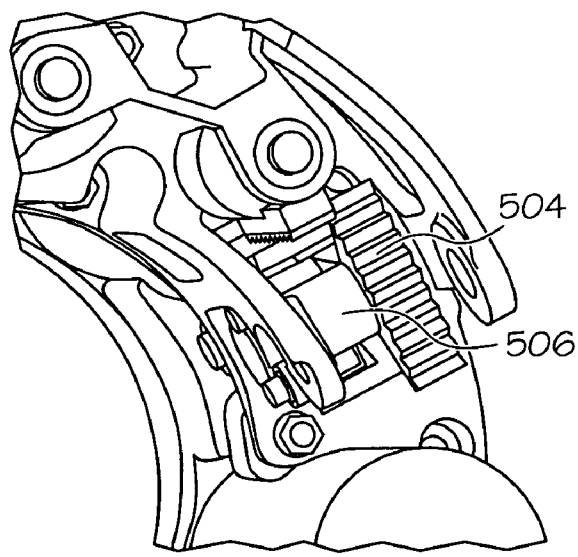

As FIGS. 5 and 6 further depict, the modular actuation control system may additionally include a plurality of locks 506. The locks 506, if included, are mounted on the bearing support assemblies 402 (or other suitable structure), and are preferably configured as electronically controllable devices, such as solenoids, that may be selectively moved between a locked position and an unlocked position. In the locked position, each lock 506 prevents (or at least inhibits) movement of one of the output sector gears 504, and in the unlocked position, each lock 506 does not prevent (or at least inhibit) movement of one of the output sector gears 504.

Figure 7:
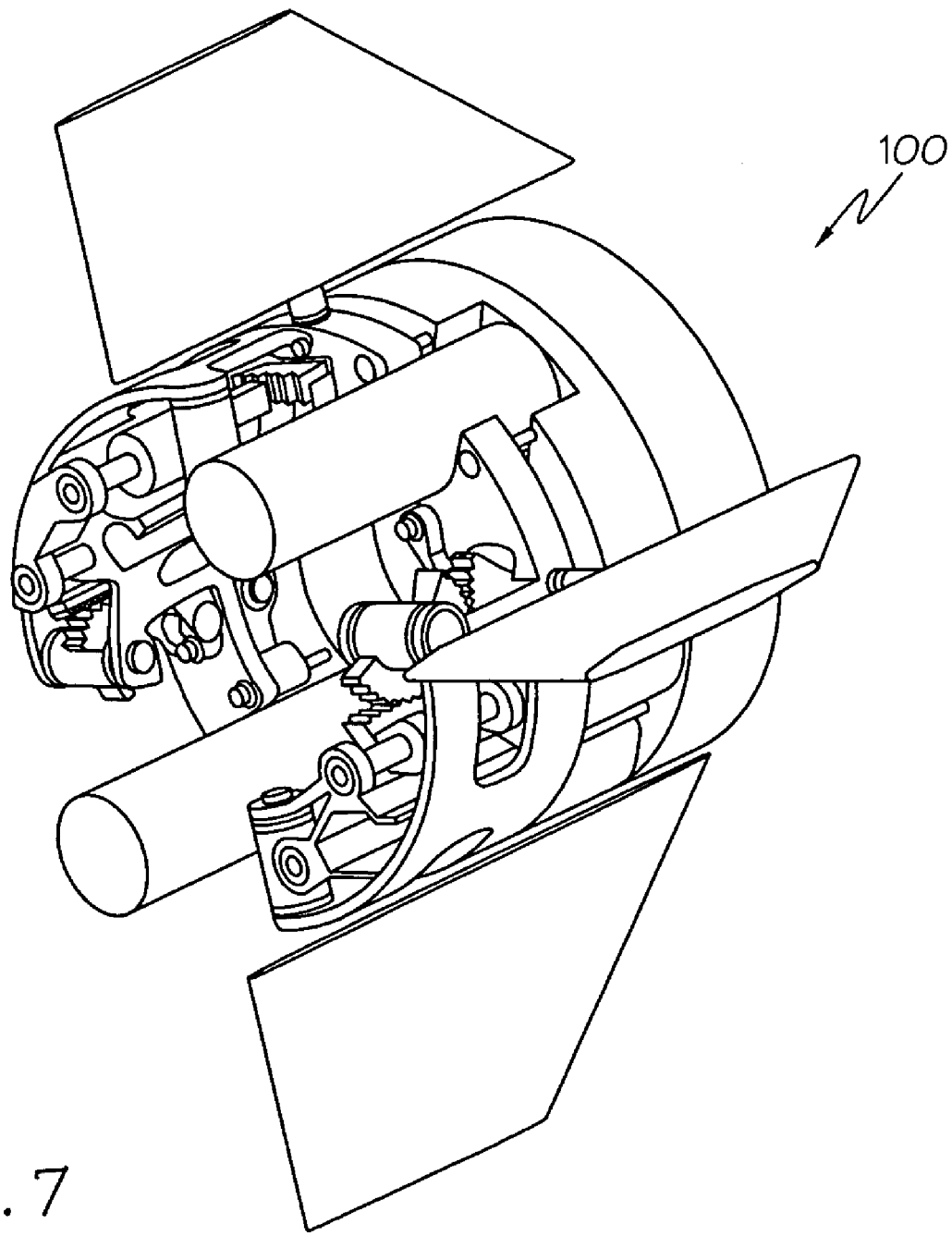
FIG. 7 depicts the exemplary modular actuation control system of FIGS. 2-6 in a fully-assembled state and coupled to a plurality of flight control fins.

The modular actuation control system, which is depicted fully assembled in FIG. 7, exhibits relatively high power density and relatively high reliability, while simultaneously having a relatively small space envelope and being relatively low in weight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A modular electromechanical fin actuation system assembly, comprising:
an electronic control unit housing, the electronic control unit housing having a plurality of motor receptacles and a plurality of battery receptacles formed in an outer surface thereof, each of the motor receptacles having an associated motor electrical interface, and each of the battery receptacles having an associated battery electrical interface;
an electronic control unit disposed within the electronic control unit housing and electrically coupled to each of the motor electrical interfaces and each of the battery electrical interfaces;
a plurality of batteries, each battery disposed within one of the battery receptacles and electrically coupled to the associated battery electrical interface;
a plurality of motors, each motor disposed within one of the motor receptacles and electrically coupled to the associated motor electrical interface;
a plurality of actuators, each actuator coupled to one of the motors and comprising a ballscrew and a ballnut, the ball screw coupled to the rotor of one of the motors, and a ballnut rotationally mounted on the ballscrew;
a bearing support assembly releasably coupled to the electronic control unit housing and engaging each of the motors;
a plurality of flight control fins, each flight control fin rotationally mounted on the bearing support assembly;
a plurality of bearing supports formed in the bearing support assembly;
a plurality of rack and pinion drives, each rack and pinion drive coupled to one of the ballnuts;
a plurality of compound sector gears, each compound sector gear rotationally mounted on one of the bearing supports via a bearing and engaging one of the rack and pinion drives;
a plurality of output sector gears, each output sector gear coupled to one of the flight control fins, rotationally mounted on one of the bearing supports via a bearing, and engaging one of the compound sector gears; and
a plurality of locks, each lock mounted on the bearing support assembly and movable between a locked position, in which it at least inhibits movement of one of the output sector gears, and an unlocked position, in which it does not at least inhibit movement of one of the output sector gears.

2. The assembly of claim 1, wherein:
each of the electric motors is a brushless DC motor that includes a stator and rotor; and
each of the electric motors includes a position sensor configured to sense rotor position and supply a position signal representative thereof to the electronic control unit.

3. The assembly of claim 1, wherein the electronic control unit is adapted to receive commands and is operable, in response thereto, to controllably energize one or more of the electromechanical actuators from at least one of the batteries.

\* \* \* \* \*